Nov. 28, 1933.  M. E. McSWAIN  1,937,289
METHOD OF MAKING MINNOW TRAPS
Original Filed Nov. 12, 1931  2 Sheets-Sheet 1
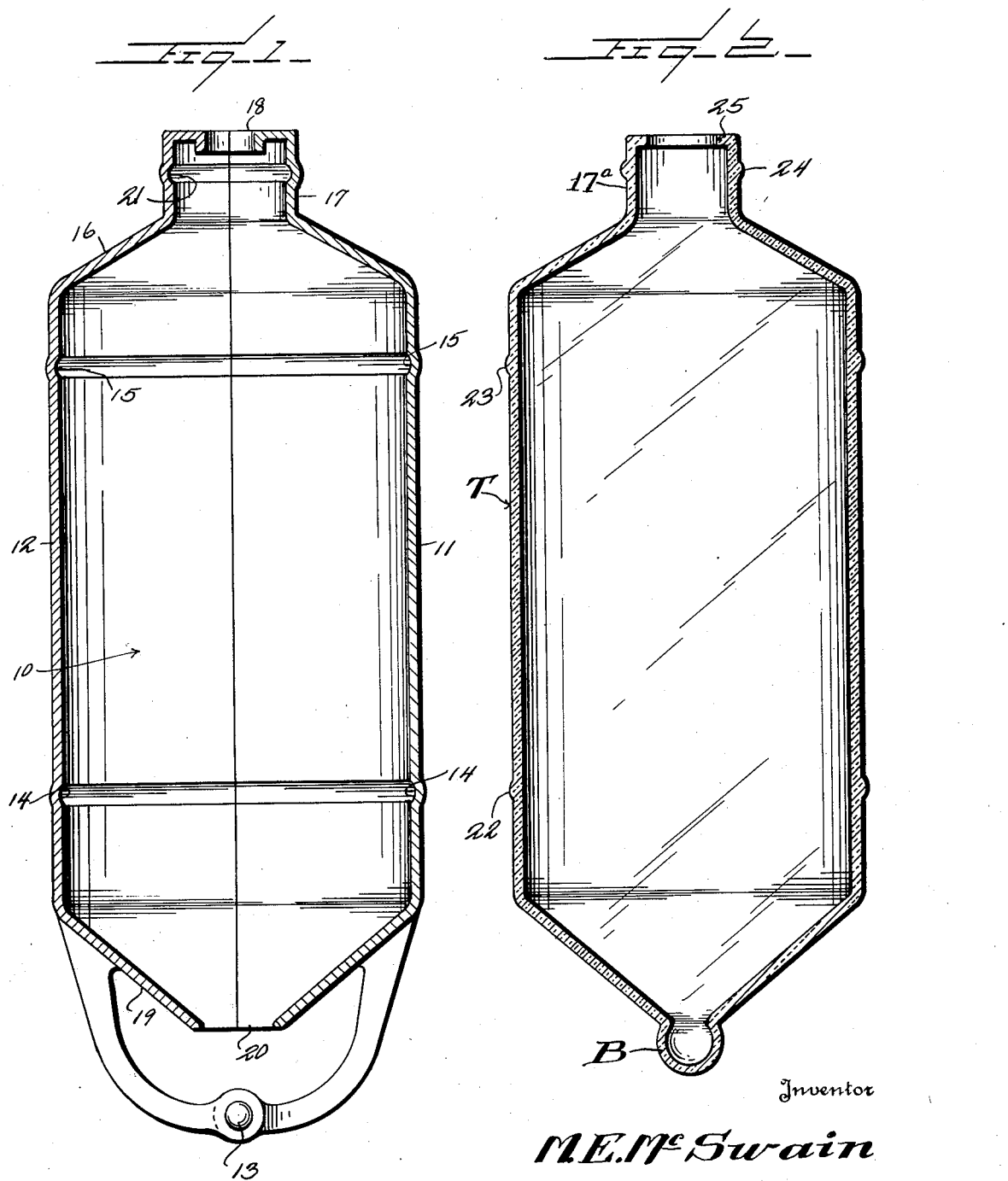

Nov. 28, 1933. M. E. McSWAIN 1,937,289
METHOD OF MAKING MINNOW TRAPS
Original Filed Nov. 12, 1931 2 Sheets-Sheet 2
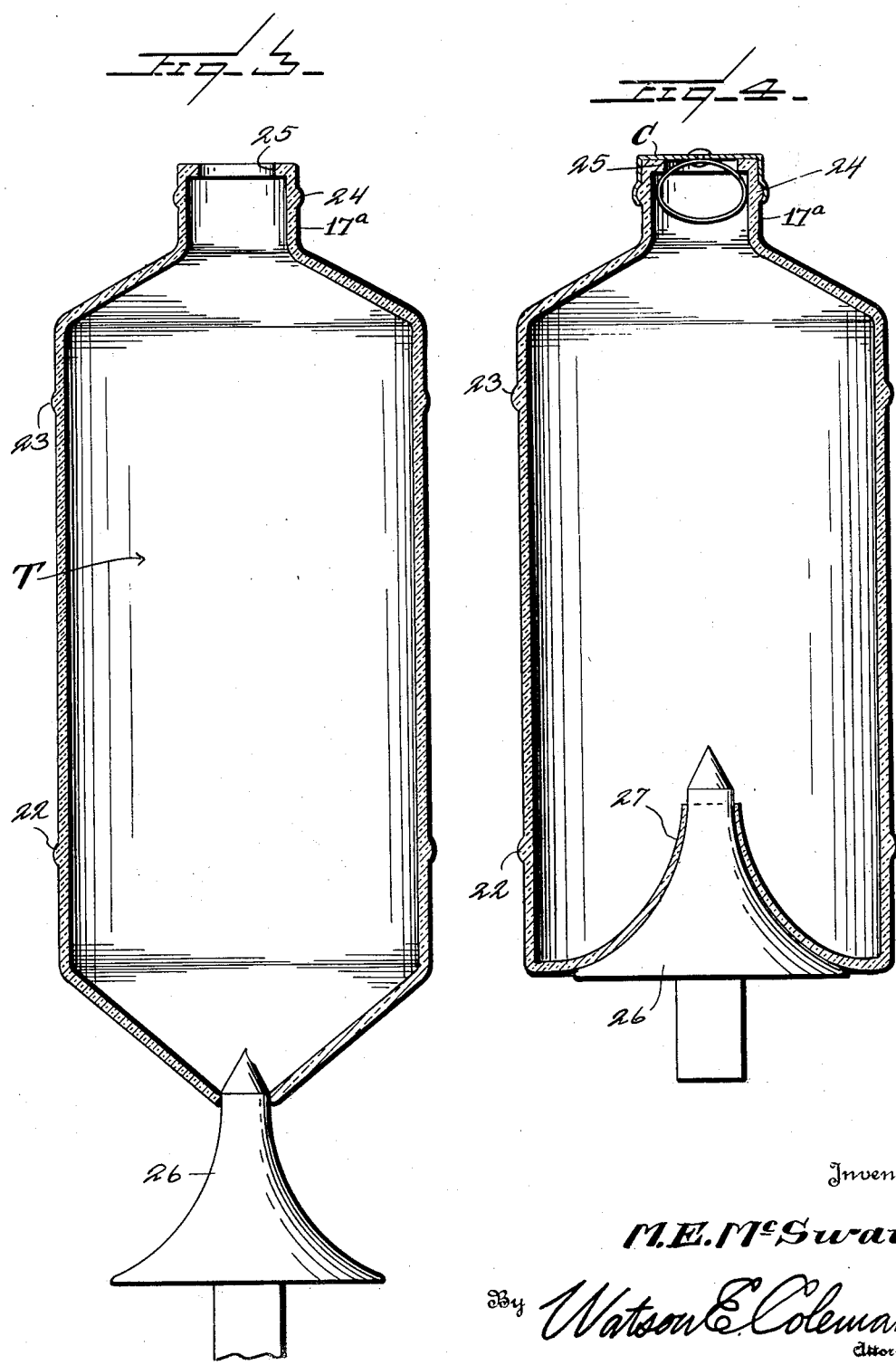

Patented Nov. 28, 1933

1,937,289

UNITED STATES PATENT OFFICE 1,937,289

METHOD OF MAKING MINNOW TRAPS

Melvin E. McSwain, Fort Smith, Ark.

Application November 12, 1931, Serial No. 574,612
Renewed July 15, 1933

3 Claims. (Cl. 49—79)

This invention relates to an improved method for making minnow traps.

An object of this invention is to provide an improved method of making a minnow trap of transparent construction, wherein the trap is provided with one end portion thereof having a restricted opening whereby the minnows may enter the trap.

A further object of this invention is to provide an improved method of constructing a minnow trap out of glass or other transparent material, this method including means whereby the trap may be blown in substantially completed form within the mold, so that only a relatively small amount of additional work is required after the trap has been removed from the mold.

A still further object of this invention is to provide an improved method for making transparent minnow traps including means for making an inwardly extending funnel-shaped end portion for the trap after it has been removed from the forming mold.

The above and various other objects and advantages of this invention will in part be described in and in part be understood from the following detailed description of the present preferred embodiment, the same being illustrated in the accompanying drawings, wherein:—

Figure 1 is a longitudinal section substantially through the center of a mold constructed according to the preferred embodiment of this invention.

Figure 2 is a longitudinal section of a trap formed within the mold shown in Figure 1.

Figure 3 is a view similar to Figure 2, but showing the second process in the construction of the trap.

Figure 4 is a view through the longitudinal center of the trap showing the manner of forming the funnel shaped open end of the trap.

Referring to the drawings wherein like numerals of reference designate corresponding parts throughout the several views, the numeral 10 designates generally a mold or form comprising complementary or opposed form sections 11 and 12, which in the present embodiment are hingedly secured together by means of a hinge construction 13 engaging one end of each of the mold sections 11 and 12.

I, of course, do not wish to be limited to the particular position of this hinge construction 13, as this construction may also be positioned longitudinally of the mold sections 11 and 12.

In the present embodiment of this invention, these mold sections 11 and 12 are substantially semi-circular in formation, but I do not wish to be limited to this particular configuration as they may be any other desired configuration. The mold sections 11 and 12 are identical in form and each is provided with a semi-circular groove 14 and 15, which grooves 14 and 15 are disposed intermediate each end of the mold sections 11 and 12 and are spaced one from the other so that when the trap is molded, the trap will be provided with peripheral or exteriorly disposed ribs or beads.

The end of the mold 10 oppositely from the hinge 13 is provided with a tapering or frustro-conical portion 16, which terminates in a substantially cylindrical neck 17. The end 18 of the neck 17 is open so as to permit the placement of glass or other transparent material within the mold 10. It is, of course, understood that each of these sections 11 and 12 are identical in form and that the sections 16, 17 and 18 are substantially semi-circular in form, and that when the two sections are placed together, a round mold will be constructed. The end of the trap 10 adjacent the hinge 13 is provided with a frustro-conical wall 19 terminating in an opening 20, the purpose for which will be hereinafter described.

The neck 17 is provided intermediate each end thereof with a groove 21 so as to form a bead or annular rib on the exterior of the trap after the trap has been formed within the mold 10. This trap T is, in the present embodiment, round in form having ribs or beads 22 and 23 formed on the exterior thereof so that when a metal band is placed about the body of the trap T, it will not slip longitudinally of the trap. When the trap T has been formed within the mold 10, a knob or button B will be formed at one end thereof, and the opposite end is open and is provided with an annular rib or bead 24 which is formed by the groove 21 in the mold 10. The neck 17a is also provided with an inwardly extending annular flange 25 so that a cap or closure member C may be engaged with the neck 17a, this cap C having either an expanding spring or clip on the inside thereof for engagement with the annular flange 25 or provided with a suitable shoulder for engagement with the annular rib 24.

When the trap T is removed from the mold, the closed end thereof is rounded or bulged out and, as disclosed in the drawings, the knob or button B is pulled longitudinally of the trap T by heating the glass inwardly of the knob B and then pulling the glass longitudinally of the trap T. This forms a substantially frustro-conical end portion which is then cut off inwardly of the closed end of the button B. In this form, a frustro-conical or funnel-shaped member 26 is inserted in the cut off end of the trap T and the glass again heated and this tool 26 pressed inwardly of the trap T, so as to carry therewith the glass forming the conical or funnel-shaped end of the trap T.

The finished trap, as disclosed in the drawings, is provided with a funnel-shaped intake member 27, which is open at the apex thereof, so as to permit the ready entrance of minnows or the like within the body of the trap T. In the use of this molding apparatus, the two mold sections 11 and 12 are held together by any desirable securing means and the molten glass or transparent material inserted through the neck opening 18. This glass is blown so that it will contact with the interior of the mold 10 and will assume the configuration of the interior and due to the open end 20, a portion of the glass or transparent material will pass through the opening 20 and form a knob or button of relatively thick material which, during the further formation of the trap, can be readily grasped with the desired tool and the tapered end portion of the trap pulled so as to form a substantially frustro-conical or funnel-shaped end which is subsequently reheated after the closed end has been cut off and the tool 26 inserted in the cut off end and pressed inwardly while the material is hot, so that it will readily bend or can be formed into the desired configuration. This tool 26 is preferably of a funnel-shape or frustro-conical configuration, so that when the end of the trap has been pressed inwardly, a cone-shaped or funnel member 27 will be formed, this providing the intake end of the trap through which the minnows are adapted to pass. During the use of the trap T, the neck 17a has the cap or closure C engaged therewith so as to prevent the passage of minnows through the trap. This cap C provides means whereby the minnows and any water within the trap may be readily removed therefrom.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. The method of constructing a transparent minnow trap including the initial molding of the trap in a mold, forming a closed end portion with one end of the trap, drawing out the closed end portion into substantially a frustro-conical formation, cutting off the apex of the frustro-conical portion, and reverting said frustro-conical end portion so as to dispose said end portion inwardly of the body of the trap.

2. The method of constructing a minnow trap including the initial molding of a hollow trap in a mold, having an opening in one end whereby to provide a reduced button with the end of the trap, heating the end of the trap about the button while drawing said end of the trap outwardly, cutting off the end of the trap about the button, and inserting a funnel shaped tool in the reduced end of the trap, and forcing said reduced end inwardly of the body of the trap.

3. The method of constructing a trap comprising the initial formation of a hollow trap in a mold with one end thereof closed, forming an opening in the closed end at substantially the center thereof and applying funnel-shaped means under pressure to said one end in a manner to force said end inwardly and provide an inwardly extending funnel-shaped end having an opening disposed substantially within the interior of the trap.

MELVIN E. McSWAIN.